United States Patent
Kerschbaumer

(10) Patent No.: US 10,423,955 B2
(45) Date of Patent: Sep. 24, 2019

(54) METHOD FOR AVOIDING THE MISUSE OF ACCESS AUTHORIZATIONS OF AN ID-BASED ACCESS CONTROL SYSTEM

(71) Applicant: SKIDATA AG, Groedig/Salzburg (AT)

(72) Inventor: Andreas Kerschbaumer, Klagenfurt (AT)

(73) Assignee: SKIDATA AG, Grödig/Salzburg (AT)

( * ) Notice: Subject to any disclaimer, the term of this patent is extended or adjusted under 35 U.S.C. 154(b) by 956 days.

(21) Appl. No.: 14/966,190

(22) Filed: Dec. 11, 2015

(65) Prior Publication Data
US 2016/0171497 A1   Jun. 16, 2016

(30) Foreign Application Priority Data
Dec. 11, 2014   (DE) .......................... 10 2014 118 388

(51) Int. Cl.
| | | |
|---|---|---|
| *G06Q 20/40* | (2012.01) | |
| *G06Q 20/32* | (2012.01) | |
| *G07C 9/00* | (2006.01) | |

(52) U.S. Cl.
CPC ..... *G06Q 20/4014* (2013.01); *G06Q 20/3224* (2013.01); *G06Q 20/405* (2013.01);
(Continued)

(58) Field of Classification Search
CPC .......... G06Q 20/4014; G06Q 20/3224; G06Q 20/405; G07C 9/00031; G07C 9/00103; G07C 2209/08
(Continued)

(56) References Cited

U.S. PATENT DOCUMENTS

| | | | |
|---|---|---|---|
| 7,415,424 B1 * | 8/2008 | Donner | G06Q 10/02 705/5 |
| 2010/0114733 A1 * | 5/2010 | Collas | G06Q 20/12 705/26.1 |

(Continued)

FOREIGN PATENT DOCUMENTS

| | | |
|---|---|---|
| EP | 1353298 A1 | 4/2002 |
| WO | 2014012998 A1 | 1/2014 |

OTHER PUBLICATIONS

German Search Report of Corresponding DE Application No. DE 10 2014 118 398.6.

*Primary Examiner* — James D Nigh
(74) *Attorney, Agent, or Firm* — Michael J. Bujold; Davis & Bujold, P.L.L.C.

(57) ABSTRACT

As part of the method for avoiding misuse of access authorizations of an ID-based access control system comprising at least one access control device (1, 1') and a central server (2), with which the at least one access control device (1, 1') can be connected for the purposes of data communication, a data record is stored for each customer medium in a database of the central server (2). The data record contains at least one contact address of the rightful owner of the customer medium and the at least one customer medium ID. During a first interaction between a customer medium and an access control device (1, 1') of the access control system access is granted for a valid access authorization, and at the same time, or within a specified configurable time span after the interaction, a message is sent involving the data record stored in the central server (2) and the read-out customer medium ID to which the access authorization is assigned, A message is also sent to a contact address of the rightful owner of the customer medium requesting confirmation that he, the rightful owner, is currently using the customer medium. As long as no confirmation is sent by the rightful (Continued)

owner to a specified contact address of the access control system, any further entry via the access control devices (1, 1') of the access control system, and in the case of a post-payment scenario, the exit from the area covered by the access control system, is refused.

5 Claims, 1 Drawing Sheet

(52) U.S. Cl.
CPC ..... *G07C 9/00031* (2013.01); *G07C 9/00103* (2013.01); *G07C 2209/08* (2013.01)

(58) Field of Classification Search
USPC .......................................................... 705/50
See application file for complete search history.

(56) References Cited

U.S. PATENT DOCUMENTS

| | | | |
|---|---|---|---|
| 2010/0114775 A1* | 5/2010 | Griffin | G06Q 20/40 |
| | | | 705/44 |
| 2011/0187505 A1* | 8/2011 | Faith | G06F 1/1694 |
| | | | 340/10.1 |
| 2013/0063246 A1* | 3/2013 | Kim | G07B 15/00 |
| | | | 340/5.65 |
| 2014/0379576 A1* | 12/2014 | Marx | G06Q 20/35785 |
| | | | 705/44 |

\* cited by examiner

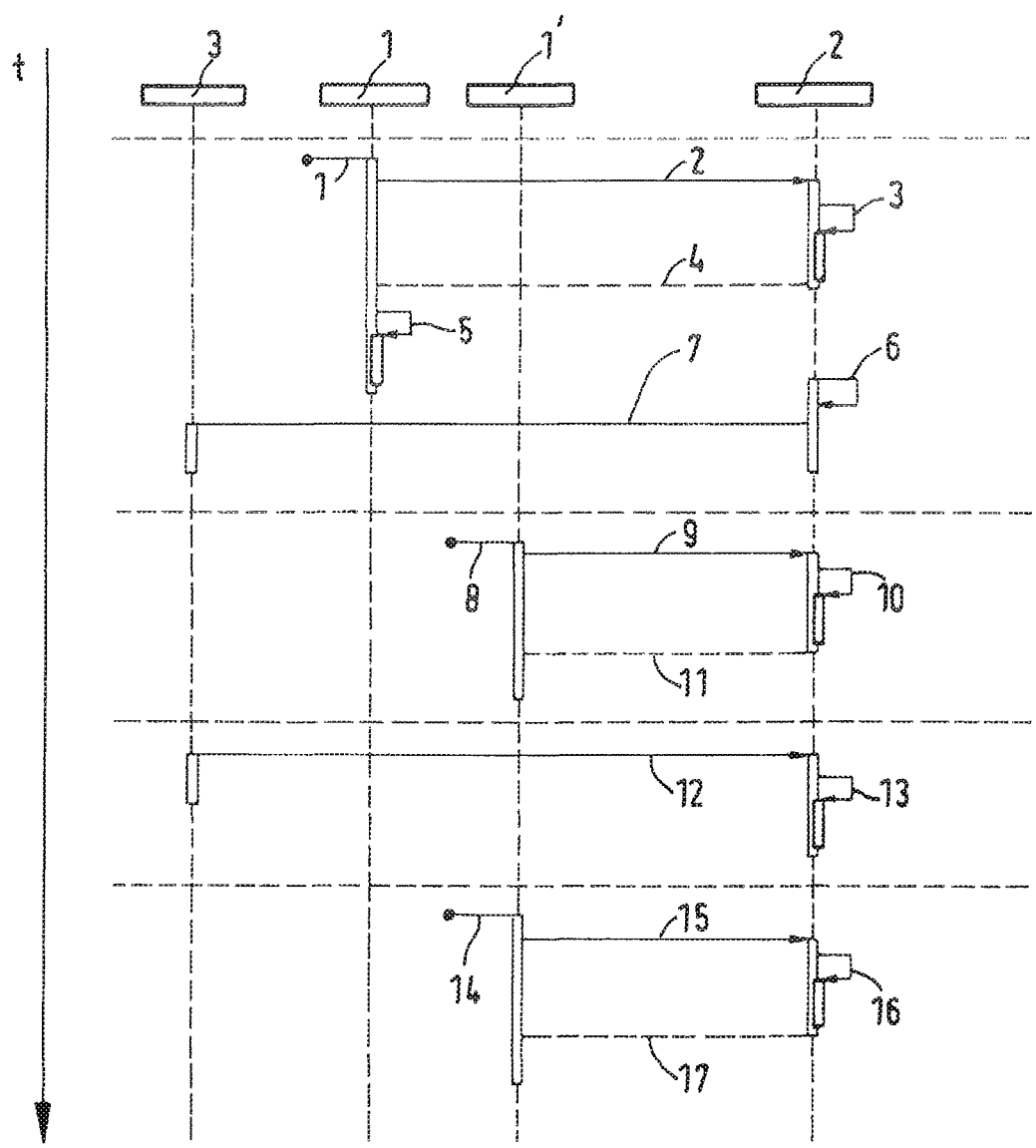

METHOD FOR AVOIDING THE MISUSE OF ACCESS AUTHORIZATIONS OF AN ID-BASED ACCESS CONTROL SYSTEM

BACKGROUND OF THE INVENTION

The present invention relates to a method for avoiding the misuse of access authorizations of a customer identification ("ID") based personnel or motor vehicle access control system.

ID-based access control systems make use of the customer medium ID, wherein the customer medium ID is read by access control devices of the access control system and sent to a central server, which by way of the ID allows or denies access via the access control device sending the ID. The customer medium may, for example, be realised as an RFID tag, an RFID card or as a paper ticket with machine-readable information.

ID-based access control systems have the advantage, compared to so-called medium-based access control systems wherein access is allowed or denied based on the information stored in the customer medium without contacting a central server, that a high degree of flexibility and scaling is ensured. A customer medium ID may have several types of access authorization assigned to it, for example for different areas and different times and different operators, which is of advantage in particular in ski resorts.

However, the customer media used may be subject to misuse in that they can be copied and then used. This leads, on the one hand, to a loss in revenue on the part of the operator of the access control system, and on the other, to the rightful owner of the customer medium being charged too much. Further misuse of a customer medium may also lead to the rightful owner of the customer medium being refused access when using the original customer medium.

If, for example, standard RFID tags are used as a customer medium, these can be freely programmed thereby making misuse quite easy. Further in case of a barcode ticket, this can be copied without any problems.

SUMMARY OF THE INVENTION

A principal objective of the present invention, therefore, is to provide a method for avoiding misuse of access authorizations in an ID-based access control system.

Accordingly, a method is proposed for avoiding the misuse of access authorizations of an ID-based access control system which comprises at least one access control device and a central server, to which the at least one access control device is connectable for the purposes of data communication. A data record is stored for each customer medium in a database of the central server, which data record contains at least one contact address of the rightful owner of the customer medium and the at least one customer medium ID. The at least one contact address can be disclosed by the rightful owner at the time of purchasing the access authorization, such as via an online transaction.

According to the invention access is granted during the first interaction between a customer medium and an access control device of the access control system for a valid access authorization, wherein at the same time or within a pre-defined configurable time span after the interaction involving the data record stored in the central server and the read-out customer medium ID to which the access authorization is assigned, a message is sent to a contact address of the rightful owner of the customer medium requesting confirmation that he, the rightful owner, is currently using the customer medium.

As long as no confirmation on the part of the rightful owner is sent to a specified contact address of the access control system, further entry via the access control devices of the access control system is refused, wherein in the event of a post-payment scenario, the user is refused exit from the area covered by the access control system.

Access control systems with a post-payment scenario in terms of the invention are access control systems, where on leaving the area covered by the access control system, the corresponding fees have to be paid in order to be able to leave the area.

During the first interaction between the customer medium and an access control device of the access control system the customer medium ID to which the access authorization is assigned, is read and transmitted to the central server, where on the one hand the access authorization is verified for its validity and where, on the other hand, for a valid access authorization, the message is sent to the rightful owner based on the data record stored in the database of the central server.

The type of message which is sent by the access control system to the rightful owner of the customer medium depends on the type of contact address which is stored in the corresponding data record. The message may, for example, be an email, a text or a contact address which is assigned to an app in a mobile device of the user.

The confirmation required on the part of the user is therefore sent as a text, an email or an app message to a specified contact address of the access control system.

As long as the rightful owner of the customer medium does not transmit the required confirmation, the access authorization, the customer medium ID to which the access authorization is assigned, all IDs of the customer medium in case several IDs are present, or all IDs of the rightful owner are blocked. This is done by setting a corresponding flag in the database of the central server of the access control system. When the rightful owner sends the confirmation and the confirmation is received, this flag is deleted, wherein for each further interaction within the access control system between the customer medium and the access control devices for a specified time or for a specified number of interactions between the customer medium and one of the access control devices of the access control system, the access authorization is verified in the normal way without the message being sent containing the request for confirmation.

In terms of a further development of the invention the area covered by the access control system can be divided into partial areas, wherein the method according to the invention is performed for each first interaction between an access control device and a customer medium in the respective partial areas. Misuse of a customer medium, for example, for access to the lifts, for driving into a car park and for access to a wellness area in a ski resort can thereby be avoided.

In terms of a further development of the invention provision may be made, in the case of an access control system for a car park, whereby confirmation is required for each drive-in, regardless of whether a previous drive-in has been confirmed by the rightful owner of the customer medium.

According to the invention, in case of an access control system with a post-payment scenario, a receipt of confirmation of the rightful owner can optionally trigger a respective payment operation via account data or credit card data stored in the central server or input by the user, thus allowing a pay-per-use system to be implemented in an advantageous manner. For example, a skier no longer needs to purchase a day pass in advance, but can purchase it following a first interaction with an access control device of the ski resort.

Preferably the messages of the access control system are sent to mobile terminals, for example mobile phones of the rightful owners.

For a full understanding of the present invention, reference should now be made to the following detailed description of the preferred embodiment of the invention as illustrated in the accompanying drawing.

BRIEF DESCRIPTION OF THE PREFERRED EMBODIMENT

The single FIG. 1 is a sequence diagram illustrating the operation of the method according to the present invention.

DESCRIPTION OF THE PREFERRED EMBODIMENT

At the start of the method according to the invention the customer medium ID is read during the first interaction between a customer medium and an access control device 1 and transmitted to the central server 2 (steps 1, 2), wherein the validity of the access authorization is verified in the central server 2 and if the access authorization is valid, the transaction data is stored (step 3) and the information "allow access" is sent to the access control device 1, wherein subsequently a barrier element of the access control device is actuated in opening direction (step 5).

In the embodiment shown, at the same time or within a predefined configurable time span, the customer medium ID to which the access authorization is assigned, is blocked in a database of the central server 2, which is done by setting a corresponding flag (step 6), and a message is sent from the central server 2 to a mobile phone 3 of the rightful owner, for example as a text, requesting confirmation that the customer medium is currently being used by him (step 7).

As long as no confirmation is sent on the part of the user to the access control system, further entry via an access control device 1' of the access control system is refused (steps 8, 9, 10, 11). During this interaction the customer medium ID is read and sent to the central server 2 (steps 8, 9), wherein it is ascertained in the central server 2, as to whether the customer medium ID to which the access authorization is assigned is blocked due to a still outstanding confirmation (step 10). If this is the case, the information "deny access" is sent to the access control device (step 11).

Once the requested confirmation has been received by the access control system from the rightful owner of the customer medium (step 12), blocking of the ID in the central server 2 is cancelled by deleting the flag (step 13) so that for a next interaction between the customer medium and an access control device 1' of the access control system (steps 14, 15) and a corresponding evaluation of the ID in the central server 2 (step 16), the information "allow access" is sent to the access control device 1' (step 17).

There has thus been shown and described a novel method for avoiding the misuse of an ID-based access control system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for preventing misuse of access authorizations of an ID based access control system having at least one access control device which is connected to a central server to facilitate data transmission therebetween, the central server having a database which stores a data record for each of a plurality of customer media, each of the data records contains at least one contact address of a rightful owner of the customer medium and an ID of the customer medium, the method comprising:

initiating a first interaction between a customer medium and an access control device by reading-out the ID of the customer medium with the access control device;

transmitting, with the access control device, the customer medium ID to the central server during the first interaction between the customer medium and the access control device;

verifying, with the central server, during the first interaction, a validity of an access authorization which is assigned to the customer medium ID;

granting a customer possessing the customer medium access, with the access control device, to an area covered by the access control system when a valid access authorization is verified by the central server;

sending a message, with the central server, to the contact address of the rightful owner of the customer medium either at a same time or within a specified configurable time span after the first interaction involving the data record stored in the central server and the read-out customer medium ID to which the access authorization is assigned, the message being a request for confirmation that the rightful owner is currently using the customer medium; and either preventing the customer possessing the customer medium any further entry to the area covered by the access control system via the access control devices of the access control system or, in a post-payment scenario, preventing the customer possessing the customer medium to exit from the area covered by the access control system as long as no confirmation is received by a specified contact address of the access control system from the rightful owner.

2. The method for preventing misuse of access authorizations of an ID-based access control system according to claim 1, further comprising:

blocking, with the central server, the access authorization which is assigned to the customer medium ID, all IDs of the customer medium in case several exist, and IDs of the rightful owner by setting a corresponding flag in the database of the central server as long as no confirmation is received by the specified contact address of the access control system from the rightful owner;

deleting the corresponding flag, with the central server, when the confirmation is sent from the rightful owner and received by the specified contact address of the access control system; and verifying, with the central server, the access authorization without sending a further message requesting confirmation being sent for each subsequent interaction within the access control system between the customer medium and the access control devices for at least one of (i) a specified time and (ii) a specified number of interactions.

3. The method for preventing misuse of access authorizations of an ID-based access control system according to claim 1, further comprising dividing the area covered by the access control system into a plurality of partial areas and each of the plurality of partial areas having at last one access control device, the method being implemented in each of the plurality of partial areas for each first interaction between the respective access control device in each of the plurality of partial areas and the customer medium.

4. The method for preventing misuse of access authorizations of an ID-based access control system according to claim 1, further comprising for an access control system of a car park, sending the message requesting confirmation, with the central server, to the contact address of the rightful owner of the customer medium for each drive-in, irrespective of whether a confirmation was received by the specified contact address of the access control system from the rightful owner for a previous drive-in.

5. The method for preventing misuse of access authorizations of an ID-based access control system according to claim 1, further comprising in a case of the access control system with the post-payment scenario, triggering, with the central server, a respective payment operation via either account data or credit card data either stored in the central server or to be input by the customer.

\* \* \* \* \*